May 2, 1967
J. SCHAEFER
3,317,813
CURRENT BALANCING CIRCUIT FOR RECTIFIERS
HAVING PHASE CONTROL REGULATORS
Filed Nov. 6, 1963
2 Sheets-Sheet 1
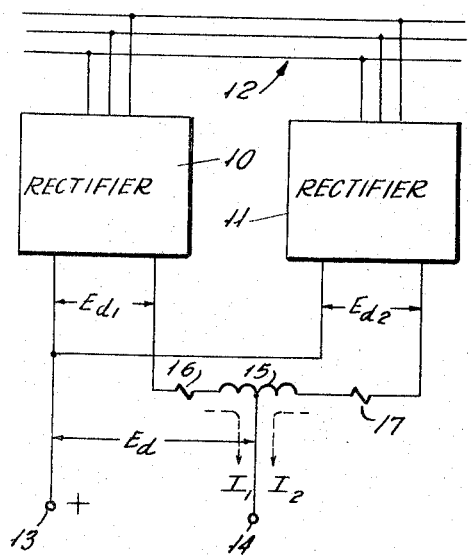
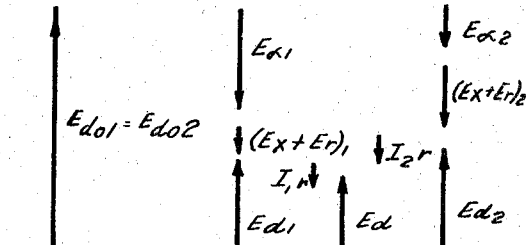
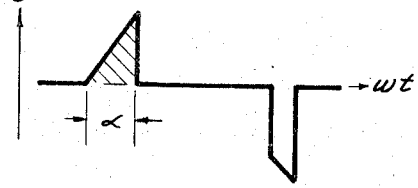
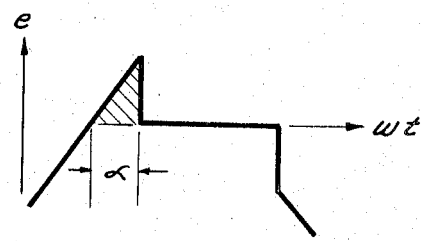
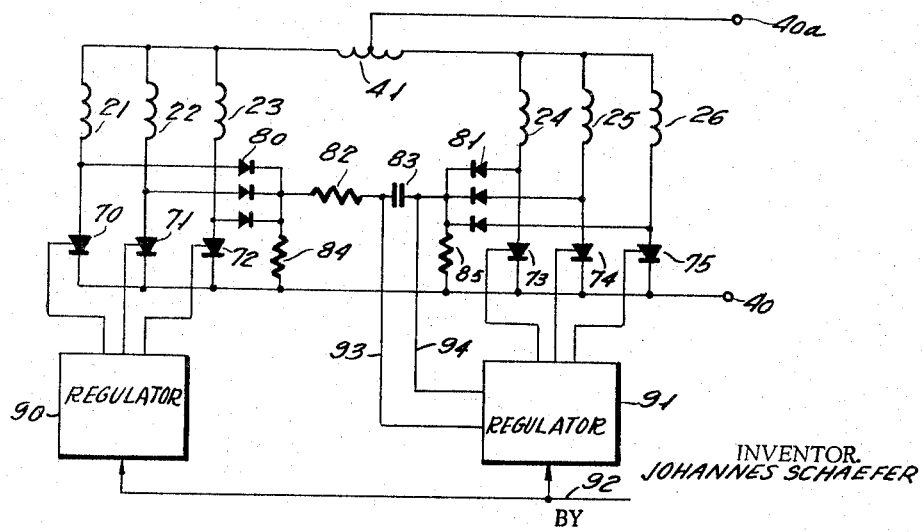
INVENTOR.
JOHANNES SCHAEFER
BY
OSTROLENK, FABER, GERB & SOFFEN
ATTORNEYS

INVENTOR.
JOHANNES SCHAEFER
BY
OSTROLENK, FABER, GERB & SOFFEN
ATTORNEYS

United States Patent Office 3,317,813
Patented May 2, 1967

3,317,813
**CURRENT BALANCING CIRCUIT FOR RECTI-
FIERS HAVING PHASE CONTROL REGU-
LATORS**
Johannes Schaefer, Philadelphia, Pa., assignor to I-T-E
Circuit Breaker Company, Philadelphia, Pa., a corporation of Pennsylvania
Filed Nov. 6, 1963, Ser. No. 321,843
6 Claims. (Cl. 321—26)

This invention relates to rectifier circuits having interphase transformers, and more specifically relates to a novel circuit for measuring an unbalance in the operation of two rectifier sections and for generating a corrective signal to a suitable regulator means.

Many rectifier circuits require the use of an interphase transformer. Thus, where a rectifier circuit has sections with displaced output voltage ripple, an interphase transformer is required to combine the direct current output of the two or more rectifier circuits. The interphase transformer serves to absorb the differences of the output voltages of these circuits.

In designing an interphase transformer, the exciting current is preferably kept as small as possible as by using an air gap or no air gap at all. This can be done, however, only where the D.-C. components of the currents being combined are in balance, and thus cancel out within the interphase transformer. If this balance does not exist between the different circuits being combined, and a minimum air gap is used in the interphase transformer, the transformer will saturate and will not function as required.

This unbalanced condition usually is found when the output voltages of the individual sections being combined are not perfectly matched. By way of example, output voltage is frequently magnetically controlled in the well-known manner by control reactors. When the control reactors of the different rectifier sections being combined differ in their magnetic properties or in their mode of control, an unbalance in the operation of the different systems may occur.

Another typical method of control is in the use of controlled rectifiers for the rectifier system. In this case, where the firing circuits of the different systems do not perform identically, there will be an unbalance in the output of the different systems.

Since it is desirable to have a minimum air gap in the interphase transformer, it is, therefore, understood that a circuit which will balance the operation of the different rectifier systems connected through the interphase transformer is highly desirable.

The control system implies the need for deriving a signal which contains information to the behavior of each of the systems. Signal deriving systems of this type are well-known to the art, and are generally complex and expensive. By way of example, transductors have been used for measuring the individual currents in the various rectifier elements in each system. This, however, is an expensive arrangement.

The principle of the present invention is to provide a novel sensing circuit which continuously monitors the regulating condition of the various rectifier sections of a rectifier system. More specifically, and in accordance with the invention, the amount of voltage withheld from the system by the regulating means of any rectifier section is measured and integrated and then compared to the integrated voltage time area withheld by other sections of the same rectifier system. When a difference is sensed, a suitable correction signal may then be generated to correct the operation of one or both of the units.

Where the invention is applied to a control system using control reactors, the amount of flux reversed by the reactors prior to full forward conduction (saturation in the forward direction) is measured by a suitable system, whereas in the case of a controlled rectifier-type control, the amount of voltage withheld prior to firing of the rectifier is measured.

The circuitry required for obtaining this information may be relatively simple and inexpensive as compared to the prior use of relatively expensive monitoring equipment which measures the actual current flow in the elements or the output voltage of the systems.

Accordingly, a primary object of this invention is to provide a novel monitoring circuit for a regulator system.

Another object of this invention is to utilize the voltage withheld by a control means in a rectifier system for balancing circuits which balance the operation of a plurality of parallel rectifier sections feeding a common load.

Another object of this invention is to provide a novel balancing circuit for a plurality of rectifier sections feeding a common circuit.

Yet another object of this invention is to provide an inexpensive regulator system for rectifiers which have an interphase transformer.

These and other objects of this invention will become apparent from the following description when taken in connection with the drawings, in which:

FIGURE 1 schematically illustrates two rectifier systems which have their output currents combined in an interphase transformer.

FIGURE 2 schematically illustrates the voltage conditions for the system of FIGURE 1.

FIGURE 3 illustrates the voltage absorbed by a control reactor used for the control of FIGURE 1.

FIGURE 4 illustrates a diagram showing the voltage absorbed by a controlled rectifier prior to its firing when used in the system of FIGURE 1.

FIGURE 7 shows a rectifier system similar to that of FIGURE 5 wherein control is achieved through the use of controlled rectifier devices instead of control reactors.

Figure 5:
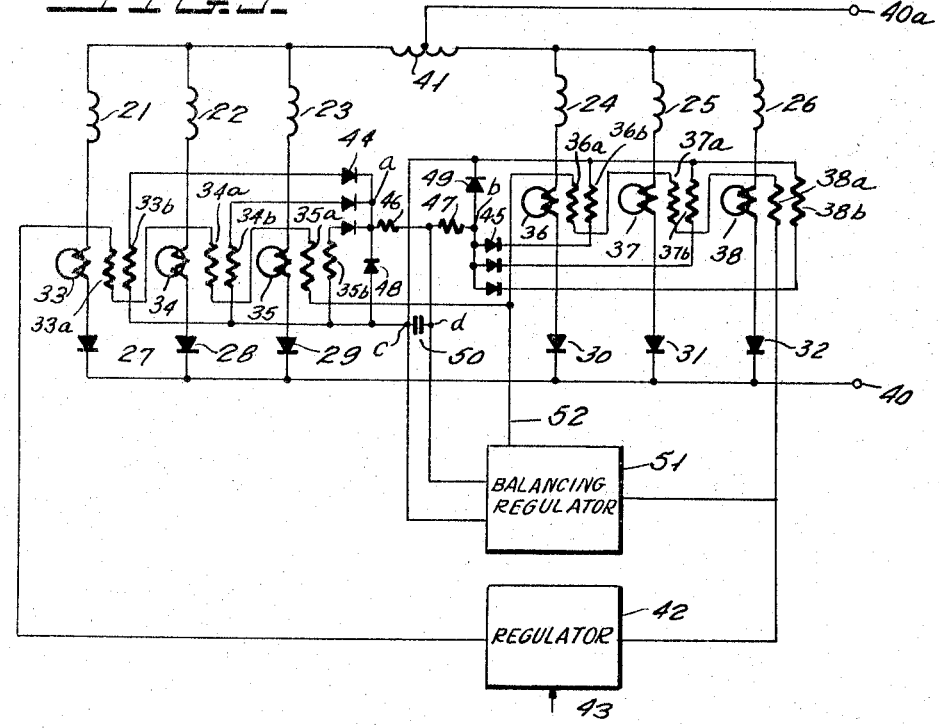
FIGURE 5 is a schematic diagram of a three-phase rectifier system having controlled reactors which incorporates the principles of the present invention.

Referring first to FIGURE 1, I have shown therein two rectifier sections 10 and 11 of a rectifier system which are each connected to a three-phase A.-C. input system 12, and are connected to common D.-C. terminals 13 and 14. The negative terminals of each of rectifiers 10 and 11 are combined in a suitable interphase transformer 15 which has a center tap connected to negative terminal 14.

When no load current is drawn from the two rectifier sections 10 and 11 (zero phase control), their output no-load voltages are shown in FIGURE 2 as voltages $E_{do1}$ and $E_{do2}$ which are necessarily equal.

Assuming that each rectifier section 10 and 11 has some means for achieving phase control, a typical phase control condition is shown in FIGURE 2 wherein the output voltages of rectifiers 10 and 11 are reduced by $E_{a1}$ and $E_{a2}$ because of differences in the nature of the phase control systems of rectifiers 10 and 11.

The common output voltage $E_d$ at terminals 13 and 14 must, of course, be the same for both sections. Therefore, voltage drops must compensate for the different values of $E_{a1}$ and $E_{a2}$, and this can be achieved only by having different load currents for each of rectifiers 10 and 11. As previously indicated, this type operation will saturate the interphase transformer 15 so that it will cease to operate if the transformer is designed with the preferred minimum air gap.

The voltage drops which come about to compensate for the differences in $E_{a1}$ and $E_{a2}$ are the reactive and resistive internal voltage drops $(E_x+E_r)_1$ and $(E_x+E_r)_2$ respectively as well as the voltage drops across the resistance of the external circuit in the amount $I_1r$ and $I_2r$ respectively. The resistors 16 and 17 schematically illustrate the resistance $r$. These voltage drops, however, are extremely small, and, therefore, are not suitable for deriving a control signal which corrects or balances the output voltages of rectifiers 10 and 11. Moreover, the internal voltages drops mentioned above are not accessible, since they are not concentrated in any particular portion of the circuit.

The principle of the present invention is to utilize the voltage reductions $E_{a1}$ and $E_{a2}$ to monitor the balance between sections 10 and 11.

In a magnetically controlled circuit, these values would correspond to the time integral of the voltage absorbed by control reactors. This may be seen from FIGURE 3 which shows the voltage across a control reactor in series with a suitable rectifier as a function of phase angle. The cross-hatched area in FIGURE 3 shows the voltage absorbed by the control reactor before the reactor saturates and its associated diode begins to conduct a forward current. As will be seen more fully hereinafter, the value of this time integral is measured by first separating it from the negative portion shown in the uncross-hatched area in FIGURE 3 which is induced during a flux reset period, and integrating this value for each of the control reactors in the system.

Another manner in which this absorbed voltage time integral appears is in the voltage time area withheld from the circuit by a controlled rectifier used as the control element. This can be seen in FIGURE 4 which shows the forward voltage across a controlled rectifier in a rectifier circuit as a function of phase angle. Thus, the cross-hatched area represents that portion of the voltage which falls across the controlled rectifier prior to the time that the rectifier is fired. Here again a suiable circuit will be provided for measuring this voltage time area in the forward direction and integrating all the voltage time areas of each of the controlled rectifiers of the system.

A first embodiment of the invention is shown in FIGURE 5 which illustrates a double-Y-connected rectifier system using an interphase transformer. More specifically, the rectifier system of FIGURE 5 includes the secondary transformer windings 21 through 26 of a suitable power transformer which are connected in series with respective diodes or suitable groups of diodes 27 through 32 respectively.

A control recactor is then provided for magnetically controlling the action of each of the phases and includes the control reactors 33 through 38 respectively. Each of diodes 27 through 32 then terminate on a common bus which leads to positive terminal 40, while an interphase transformer 41 combines the left and right-hand systems and provides a negative output bus connected to negative terminal 40a.

The operation of control reactors 33 through 38 is then controlled in the usual manner by a bias current applied to control windings 33a, 34a, 35a, 36a, 37a and 38a respectively which are connected in series with one another and in series with a suitable regulator device 42. The regulator device 42 may clearly have a suitable input from some other control source, as schematically illustrated by input arrow 43. Separate control windings used for a balancing control signal are then provided for each of the reactors, and are shown as windings 33b, 34b, 35b, 36b, 37b and 38b respectively.

Each of windings 33b, 34b and 35b are then connected in Y and to a three-phase half wave bridge-connected rectifier 44. The other windings 36b, 37b and 38b are similarly connected in Y to a second three-phase half wave bridge 45. The output of bridge 44 is then connected to resistor 46, resistor 47 and the output of bridge 45.

A free-wheeling diode 48 is then connected to bridge 44, as shown, while a similar free-wheeling diode 49 is connected to one end of bridge 45, as shown. Each of diodes 48 and 49 is then connected to capacitor 50 which is, in turn, connected to the input of a balancing regulator circuit 51. The output of the balancing regulator circuit 51 in response to its input voltage taken across capacitor lator 42 so that the output signal generated by regulator 51 in response to its input voltage taken across capacitor 50 is superimposed on the control voltage of the system for the case only of windings 36a, 37a and 38a. That is to say, a return conductor 52 carries the correction signal from regulator 51 back to the regulator so that balance correction is made only on the right-hand control reactors 36, 37 and 38 respectively.

In operation in the rectifier section to the left of the interphase transformer 41 of FIGURE 5, the bridge 44 separates the positive portions of the voltages induced in windings 33b, 34b and 35b from the negative values. In the section on the right of interphase transformer 41, the windings 36b, 37b and 38b are oppositely wound with respect to their gate windings so that the voltage time areas induced therein will have negative polarity which is separated by means of bridge 45 from the positive values. Thus, a current will flow from point $a$ to point $b$ in FIGURE 5. If both systems are in balance, the average value of the voltage between points $c$ and $d$ (across capacitor 50) will be zero. The voltage between points $c$ and $d$ is integrated by means of the capacitor 50, and is then delivered to the input of the balancing regulator 51 where it controls the correcting current superimposed upon the main control current in the rectifier section to the right of the interphase transformer 41. Note that the free-wheeling diodes 48 and 49 prevent the potential between points $a$ and $b$ from assuming reverse values to thereby guarantee that the only voltage time integral used to determine the balancing signal will be that shown in cross-hatched lines in FIGURE 3.

Figure 6:
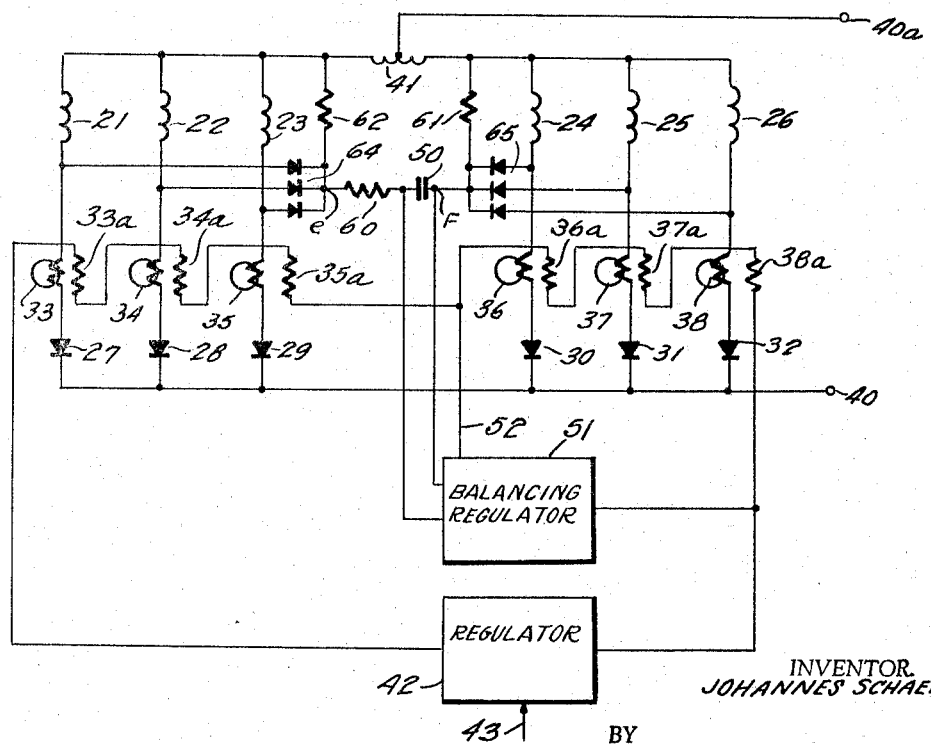
FIGURE 6 shows a modification of the circuit of FIGURE 5 which simplifies reactor construction.

FIGURE 6 shows a modification of the circuit of FIGURE 5 which eliminates the need for the auxiliary windings 33b through 38b. In FIGURE 6 components similar to those of FIGURE 5 are given similar identifying numerals.

More specifically, in FIGURE 6, the output of a bridge connected rectifier 64 is connected directly to resistor 60 and a resistor 62 and one side of capacitor 50, while the output of bridge connected rectifier 65 is connected to the other side of capacitor 50 and to a resistor 61. It will also be noted that one end of the series connected windings 36a, 37a and 38a is connected to conductor 52 of balance regulator 51 so that balancing operation is applied to the rectifier section to the right of interphase transformer 41.

In operation, the potential appearing between points $e$ and $f$ of FIGURE 6 are those which represent the output voltage of the systems without voltage reduction caused by phase control.

The common output appearing at the bus ending in terminal 40 sees a potential that is reduced by the control reactors. Since tihs potential is common to both sides, or both rectifier sections, a different voltage reduction for one system from the voltage reduction of the other will cause a difference in the average potentials at points $e$ and $f$. This difference is then integrated in the resistance-capacitance circuit including resistor 60 and capacitor 50 and is used to correct the operation of the right-hand section by means of the balancing regulator 51.

Thus, the principle of operation of the system of FIGURE 6 recognizes that an unbalanced voltage reduction caused by phase control must be compensated by unbalanced reactive and resistive voltage drops (see FIGURE 2) because the total output voltage is common to both systems. The two rectifier sections on the right and left-hand side of interphase transformer 41 will, therefore, sense the transformer voltages reduced by the reactive and resistive voltage drop so that the average potentials at points *e* and *f* will be different from the voltage drops due to unbalanced loading.

While FIGURES 5 and 6 have illustrated the novel invention in connection with the voltage control by control reactors, it will be apparent that the invention is equally applicable where voltage control is caused by a controlled rectifier-type device. This type arrangement is shown in FIGURE 7 wherein components similar to those of FIGURES 5 and 6 are given similar identifying numerals. In FIGURE 7, however, the combined diode and control reactor is replaced by controlled rectifiers 70 through 75. As was the case in FIGURE 6, a rectifier bridge 80 is connected to transformer windings 21 through 23, while a second rectifier bridge 81 is connected to the right-hand group of windings 24, 25 and 26. As was the case in FIGURE 6, rectifiers 80 and 81 are connected in series with resistor 82 and capacitor 83, and are further connected to the positive output bus through resistors 84 and 85.

The normal regulator for each of the two sections of the circuit of FIGURE 7 includes the regulator 90 which is connected to the gate circuits of each of controlled rectifiers 70, 71 and 72 and controls the firing of these rectifiers. A regulator 91 is provided for each of controlled rectifiers 73, 74 and 75.

A control signal common to the regulators 90 and 91 is then derived from any suitable source over the line 92. The regulator 91, however, is further provided with an additional pair of input conductors 93 and 94 which are taken from capacitor 83, thereby to additionally control regulator 91 in accordance with any measured unbalance in the operation of the two rectifier halves in FIGURE 7.

Although this invention has been described with respect to its preferred embodiments, it should be understood that many variations and modifications will now be obvious to those skilled in the art, and it is preferred therefore that the scope of this invention be limited not by the specific disclosure herein but only by the appended claims.

The embodiments of the invention in which an exclusive privilege or property is claimed are defined as follows:

1. In a rectifier system; a first rectifier section, a second rectifier section, first phase control regulation means connected to said first rectifier section, second phase control regulation means connected to said second rectifier section, and first and second control means connected to said first and second phase control means respectively; a first and second output phase control monitoring means connected to said first and second rectifier sections respectively, and comparator means connected to said first and second monitoring means for measuring the difference in phase control regulation between said first and second sections; said comparator means being connected to one of said first or second phase control regulation means for maintaining a balanced output between said first and second rectifier sections; said first and second phase control monitoring means each measuring the voltage-time area absorbed in the forward direction by said first and second phase control means.

2. In a rectifier system; a first rectifier section, a second rectifier section, first phase control regulation means connected to said first rectifier section, second phase control regulation means connected to said second rectifier section, and first and second control means connected to said first and second phase control means respectively; a first and second output phase control monitoring means connected to said first and second rectifier sections respectively, and comparator means connected to said first and second monitoring means for measuring the difference in phase control regulation between said first and second sections; said comparator means being connected to one of said first or second phase control regulation means for maintaining a balanced output between said first and second rectifier sections; said first and second phase control monitoring means each measuring the voltage-time area absorbed in the forward direction by said first and second phase control means; and interphase transformer means coupling said first and second rectifier sections.

3. The device substantially as set forth in claim 1 wherein said phase control regulation means includes magnetic reactors.

4. The device substantially as set forth in claim 1 wherein said first and second rectifier sections include controlled rectifiers for the rectifier elements thereof; said phase control regulation means including control circuit means for the gate circuits of said controlled rectifiers.

5. The device substantially as set forth in claim 2 wherein each of said rectifier sections includes a three-phase connected group of rectifier elements; said phase control regulations means including a control reactor in each of said phases.

6. The device substantially as set forth in claim 2 wherein each of said rectifier sections includes a three-phase connected group of rectifier elements; said phase control regulation means including a gate control electrode for each of said rectifier elements.

References Cited by the Examiner

UNITED STATES PATENTS 3,045,170  7/1962  Howald _____ 321—14 X
3,229,187  1/1966  Jensen _____ 321—26

JOHN F. COUCH, *Primary Examiner.*

G. GOLDBERG, *Assistant Examiner.*